(12) United States Patent
Li et al.

(10) Patent No.: US 7,636,607 B2
(45) Date of Patent: Dec. 22, 2009

(54) PHASE-OUT PRODUCT DEMAND FORECASTING

(75) Inventors: Sheng Li, Palo Alto, CA (US); Karsten Schierholt, Montreal (CA); Ralf Heimburger, St. Leon-Rot (DE)

(73) Assignee: SAP AG, Walldorf (DE)

( * ) Notice: Subject to any disclaimer, the term of this patent is extended or adjusted under 35 U.S.C. 154(b) by 256 days.

(21) Appl. No.: 11/478,752

(22) Filed: Jun. 29, 2006

(65) Prior Publication Data

US 2008/0004939 A1 Jan. 3, 2008

(51) Int. Cl.
*G06F 19/00* (2006.01)
(52) U.S. Cl. .......................................... 700/97; 705/28
(58) Field of Classification Search ........... 700/97–100, 700/107; 705/10, 28–29
See application file for complete search history.

(56) References Cited

U.S. PATENT DOCUMENTS

| | | | | |
|---|---|---|---|---|
| 6,801,908 | B1* | 10/2004 | Fuloria et al. | 707/3 |
| 7,092,929 | B1* | 8/2006 | Dvorak et al. | 705/28 |
| 2002/0143665 | A1* | 10/2002 | Santos et al. | 705/28 |
| 2003/0115090 | A1* | 6/2003 | Mujtaba et al. | 705/8 |
| 2003/0167146 | A1* | 9/2003 | Tezuka et al. | 702/129 |

\* cited by examiner

*Primary Examiner*—Kidest Bahta
(74) *Attorney, Agent, or Firm*—Blakely, Sokoloff, Taylor & Zafman LLP

(57) ABSTRACT

A system and method for generating or adjusting a demand forecast for a phased-out product is described. A demand forecast may be generated based on the historical data for the phased-out product and trends found in similar products that have been phased-out.

19 Claims, 9 Drawing Sheets

| | End Year | EY+1 | EY+2 | EY+3 | EY+4 | EY+5 | EY+6 | EY+7 | EY+8 | EY+9 |
|---|---|---|---|---|---|---|---|---|---|---|
| Product A | 100 | 90 | 80 | 70 | 60 | 50 | 40 | 30 | 20 | 10 |
| Product B | 1500 | 1200 | 1100 | 1000 | 800 | 750 | 750 | 600 | 500 | 400 |
| Product C | 300 | 300 | 250 | 200 | 100 | 70 | 60 | 50 | 40 | 30 |
| Total | 1900 | 1590 | 1430 | 1270 | 960 | 870 | 850 | 680 | 560 | 440 |
| % | 100 | 83.7 | 75.3 | 66.9 | 50.5 | 45.8 | 44.8 | 35.8 | 35.8 | 23.2 |

End Year = 1994

|  | End Year | EY+1 | EY+2 | EY+3 | EY+4 | EY+5 | EY+6 | EY+7 | EY+8 | EY+9 |
|---|---|---|---|---|---|---|---|---|---|---|
| 1994 | 100 | 83.7 | 66.9 | 66.9 | 50.5 | 45.8 | 44.8 | 35.8 | 29.5 | 23.2 |
| 1995 | 100 | 96.0 | 85.3 | 74.7 | 57.3 | 50.7 | 46.7 | 42.7 | 37.3 | |
| 1996 | 100 | 80.0 | 56.7 | 43.4 | 23.3 | 17.7 | 14.0 | 08.3 | | |
| 1997 | 100 | 77.7 | 64.4 | 48.9 | 35.6 | 25.3 | 11.6 | | | |
| 1998 | 100 | 70.5 | 40.1 | 25.0 | 13.7 | 05.1 | | | | |

Demand Curve For Group 303

|  | End Year | EY+1 | EY+2 | EY+3 | EY+4 | EY+5 | EY+6 | EY+7 | EY+8 | EY+9 |
|---|---|---|---|---|---|---|---|---|---|---|
| | 100 | 81.6 | 64.5 | 51.7 | 36.1 | 29.1 | 29.2 | 28.9 | 33.4 | 23.2 |

Historical Data for Product Z

| End Year | EY+1 | EY+2 | EY+3 | EY+4 | EY+5 | EY+6 | EY+7 | EY+8 | EY+9 |
|---|---|---|---|---|---|---|---|---|---|
| 1000 | | | | | | | | | |
| 100 | 81.6 | 64.5 | 51.7 | 36.1 | 29.1 | 29.2 | 28.9 | 33.4 | 23.2 |

Group Curve

Forecast For Product Z

| 1000 | 816 | 645 | 517 | 361 | 291 | 292 | 289 | 334 | 232 |
|---|---|---|---|---|---|---|---|---|---|

FIGURE 5

| | End Year | EY+1 | EY+2 | EY+3 | EY+4 | EY+5 | EY+6 | EY+7 | EY+8 | EY+9 |
|---|---|---|---|---|---|---|---|---|---|---|
| Historical Data for Product Z | 1000 | 900 | 800 | 700 | | | | | | |
| Group Curve | 100 | 81.6 | 64.5 | 51.7 | 36.1 | 29.1 | 29.2 | 28.9 | 33.4 | 23.2 |
| Original Forecast For Product Z | 1000 | 816 | 645 | 517 | 361 | 291 | 292 | 289 | 334 | 232 |
| Difference 703 | | 84 | 155 | 183 | | | | | | |
| Over/Under | | 9.33 | 19.4 | 26.1 | | | | | | |
| Adjusted Forecast For Product Z | 1000 | 965 | 763 | 612 | 427 | 344 | 345 | 342 | 395 | 274 |

FIGURE 7

PHASE-OUT PRODUCT DEMAND FORECASTING

FIELD OF INVENTION

The field of invention relates to supply chain management, and specifically, to forecasting demand for replacement parts of a product that has been discontinued or phased-out.

BACKGROUND

A supply chain is a network of retailers, distributors, transporters, warehouses, and suppliers that take part in the production, delivery, and sale of a product or service. Supply chain management is the process of coordinating the movement of the products or services, information related to the products or services, and money among the constituent parts of a supply chain. Supply chain management also integrates and manages key processes along the supply chain. Supply chain management strategies often involve the use of software to project and fulfill demand and improve production levels.

Logistics is a sub-set of the activities involved in supply chain management. Logistics includes the planning, implementation, and control of the movement and storage of goods, services or related information. Logistics aims to create an effective and efficient flow and storage of goods, services, and related information from a source to the target location where the product or source is to be shipped to meet the demands of a customer.

The movement of goods and services through a supply chain often involves the shipment of the goods and services between the source location at which the product is produced or stored and the target location where the product is to be shipped to the wholesaler, vendor, or retailer. The shipment of products involves a transport such as a truck, ship, or airplane and involves the planning and the arrangement of the products to be shipped in the transport. The source location from which a set of products is shipped on a transport is selected based on the availability of the products at the source location.

After a product has been discontinued or is otherwise not actively produced, it is generally necessary to maintain replacement parts for a period of time after production has stopped. These replacement parts are stored at different locations and in different quantities. Unfortunately, traditional forecasting models fail to accurately forecast the need for these replacement parts.

BRIEF DESCRIPTION OF THE DRAWINGS

The present invention is illustrated by way of example and not limitation in the figures of the accompanying drawings, in which like references indicate similar elements and in which:

FIG. 5 illustrates a long-term forecast example.

FIG. 7 is long-term forecast adjustment example.

DETAILED DESCRIPTION

In the following description, for purposes of explanation, numerous details are set forth to provide a thorough understanding of the present invention. However, it will be apparent to one skilled in the art that these specific details are not required to practice the present invention.

A forecast for the demand of a discontinued or phased-out product may be generated by looking at the trends of similar products (if available) and applying those trends to available demand data for that phased-out product. Described below are processes for generating profiles based on these trends and applying that knowledge to generate or adjust a forecast for the future demand for that product.

Phase-Out Profile Generation

A phase-out profile models demand behavior for a product or group of products that have been phased-out and are no longer used in production. A phase-out profile includes one or more of the following: historical demand data for the product(s); values for a demand curve for the product or group of products; a demand curve for the product; and/or a standard deviation for the demand curve. The values for the demand curve for a product represent the percentage of demand for a particular period with respect to the demand for the product in its final year of use in production.

Figure 2:
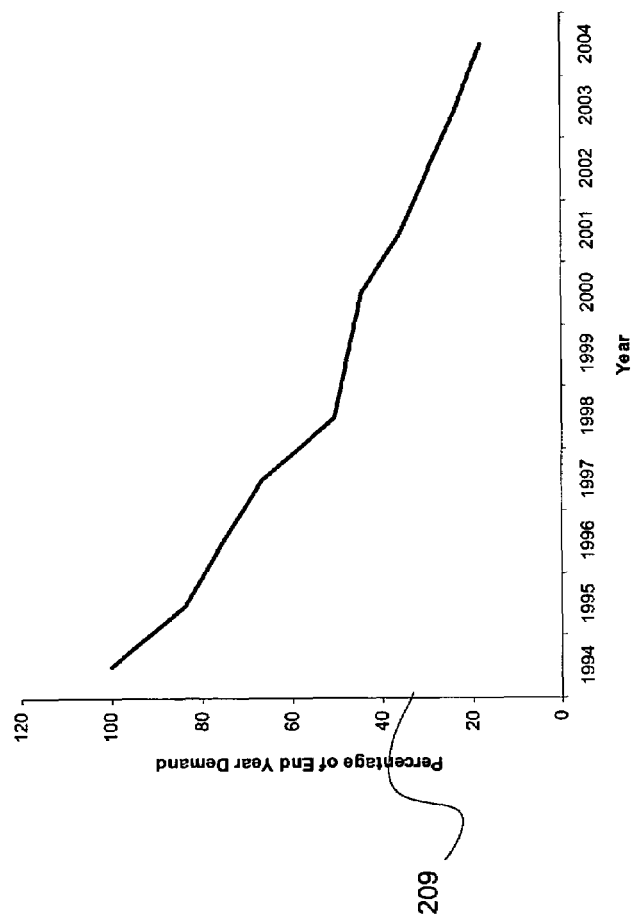
FIG. 2 illustrates an exemplary phase-out profile for a group and its historical data.

FIG. 2 illustrates an exemplary phase-out profile for a group or sub-group and its historical data. Products A, B, and C 201 were phased-out in 1994 and have similar characteristics. Products with similar characteristics may be grouped together. 1994 is considered the end year or end date for these products. Ten (10) total years of demand data are available for these products—the end year and nine sub-sequent years of demand data. Demand data includes the number of products shipped, sold, or similarly required for a period (in this case year). This data has been recorded for each of these products as shown in the table 203. In this example, the demand for product A decreased by 10 units per year. Of course, demand for a phased-out product may also increase over time.

The total demand 205 for the group may also have a row in the table. From the total demand, the percentage of the demand of a particular year compared to the end year is determinable by dividing the number of products demanded in a year following the end year by the number of products demanded in the end year and multiplying that value by 100. For example, in EY+2 (end year plus 2 year or 1996) the total demand was for 1430 products from this group. Dividing this demand (1430) by the demand in the end year (1900) and then multiplying by 100 shows that only 75.3% of the demand from 1994 was needed in 1996. Of course, equivalent mathematical formulae may be used to calculate this percentage. From these percentages, a demand curve 209 for the group may be plotted. Additionally, a standard deviation may be calculated and stored as part of the group profile or stored separately.

Figure 1:
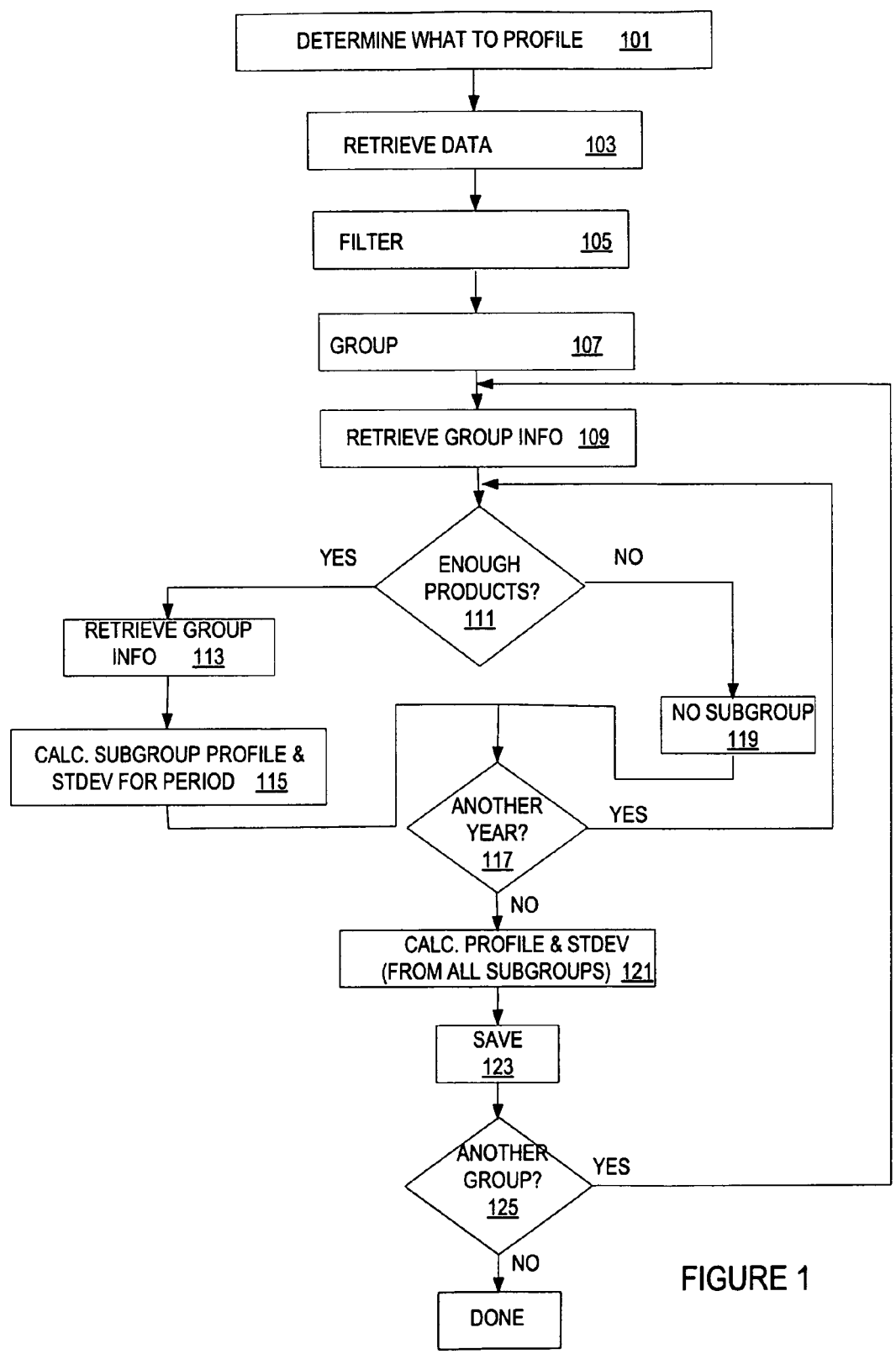
FIG. 1 shows a flow for generating a phase-out profile according to an embodiment.

FIG. 1 shows a flow for generating a phase-out profile according to an embodiment. This flow may be performed by a planning service manager or other similar software application that provides a user with a set of tools for managing the logistics of supply chain management.

The phased-out product or products that are to be profiled are selected at 101. The selected product or products has associated data stored in a storage device such as a hard disk, database, or similar storage system. The data associated with a product may include demand history data, a phase-out group relationship/assignment (for example, which phase-out group the product belongs to), production end date (for example, the year in which the product was no longer actively used in production), promotional information, and similar historical data. All or a portion of this data is retrieved from storage at 103.

A filter may be used to remove phased-out products that do not meet at least some designated criteria (rules) at 105. Filter may help optimize the flow by eliminating phased-out products that are not good candidates for long-term forecasting. Exemplary rules include, but are not limited to, removing products that: 1) do not have a phase-out group assigned; 2) do not have a production end date; 3) have a production end date that is in the future; 4) are either a successor or predecessor product (the product is interchangeable with another product); 5) are involved in promotions after the production end date; and/or 6) do not have enough demand history available (for example, do not have at least one year of demand history).

The remaining products (if a filter was applied at 105) or products selected at 101 are sorted into a phase-out group or groups at 107. Products at particular locations with the same phase-out group relationship are normally grouped together. As described earlier, a phase-out group relationship is part of stored data that may be associated with a product. A phase-out group may contain any number of products and any amount of historical data. Typically, products of a phase-out group share similar characteristics (for example, are parts of a bigger product) that likely makes their demand volumes to be similar over time. Groups may be broken down into sub-groups, with each sub-group having of products that share the same end date. Grouped products and their associated data are structured as a group phase-out profile.

If previously generated group phase-out profiles exist, they may be deleted, archived, etc. at 107. Group phase-out profiles may be created or processed serially, or in parallel if multiple groups are represented by the products selected at 101.

Phase-out group and/or sub-group profiles have parameters associated with them. These parameters are retrieved from storage at 109. The parameters include, but are not limited to: 1) a phase-out profile length (for example, the number of periods, such as years, for which the phase-out profile is to be applied in generating a long-term forecast); 2) a minimum number of products needed for the creation of a phase-out profile of a phase-out group or sub-group; 3) a phase-out profile minimum threshold, which is the minimum value that a profile may have for a particular period (for example, a profile may have a minimum threshold value of 5% of products which means that the demand cannot be marked as lower than 5% of the end year demand); 4) a value for the minimum number of historical periods required for adjustment of a long-term forecast; 5) a phase-out deviation threshold which may be used to determine if a long-term forecast should be adjusted because the forecast was deemed too inaccurate (a standard deviation may be calculated between the actual historical data and the existing long-term forecast); and/or 6) a default phase-out profile value, which is a percentage value used to calculate future demand for periods beyond available historical data (for example, in a given year beyond which historical data is available, a default phase-out value of 10% means that for each year beyond the historical data the number of needed products decreases by 10%). If a phase-out group does not exist, and therefore the phased-out product is not similar to any other product, then a default phase-out profile may be used.

For a particular period, the group is checked at 111 to determine if there are a sufficient number of products in the group for that period to provide an accurate and/or representative profile. Any number may be specified as the minimum product number. A sub-group may be created for each period (for example, each year) of the group. Products belonging to a sub-group typically share more in common than they do to other products in the group.

If there are a sufficient number of products in the group for that period, the historical data for that period is retrieved at 113. For example, if the group has five periods of data beginning with the production end date and ending four periods later, then the information (such as the number products needed for that period) from one of those periods is retrieved and a sub-group profile is formed at 113.

In an embodiment, if the end date is not in the current year, yearly history is read from the year of the end date to the last year (current year is the year of today). If the end date is in the current year, history and forecast data is read for the current year based on forecast period (not yearly). The forecast period of today will then be determined. History from the first period of the current year to the previous period of today's period will be read and the forecast from today's period to the last period of the year will also be read. These history and forecast data in forecast periods will be added together to form the projected history of the current year. Values for the sub-group profile and standard deviation are generated/calculated for the period at 115. As described above, these values may include: historical demand data for the product(s); values for a demand curve for the product or group of products; a demand curve for the product; and/or a standard deviation for the demand curve If the minimum number is not meet, then a sub-group is not created at 119.

A determination is made if there is another period (and therefore sub-group) to profile at 117. If there is, then another sub-group profile and standard deviation is calculated for a different period of the group. Of course, a sub-group may contain information about more than one phased-out product.

A phase-out profile and standard deviation for the entire group is generated at 121. In one embodiment, all of the sub-group phase-out profiles and standard deviations are averaged to generate a single group profile. In another embodiment, weighted averaging of the sub-groups is used to help prevent an abnormal period or sub-group from skewing the phase-out profile.

The group phase-out profile and standard deviation for the location product is generated/saved at 123. Phase-out profiles may be saved as separate files and/or joined into a single group file. A phase-out profile is typically a data structure embodied in a file such as an eXtended Markup Language (XML), Microsoft Excel file, or any other text based file.

A determination if there are more groups to generate profiles for is made at 125. If another group is to be profiled, then the respective group parameters, if available, are read from storage at 109, etc.

The process of generating group phase-out profiles is repeatable periodically, on receipt of updated demand data, upon request by a user, etc. Updated demand data may be received and made available immediately or over time. For example, additional demand data for a sub-group received from a retailer may trigger a regeneration of a group phase-out profile performed at that time or the generation of the group phase-out profile may be performed at a later time when more information about other sub-groups or groups have been received from the retailer. In an embodiment, if no "new" products have been added or updated, then the group phase-out profile is not updated.

Figure 3:
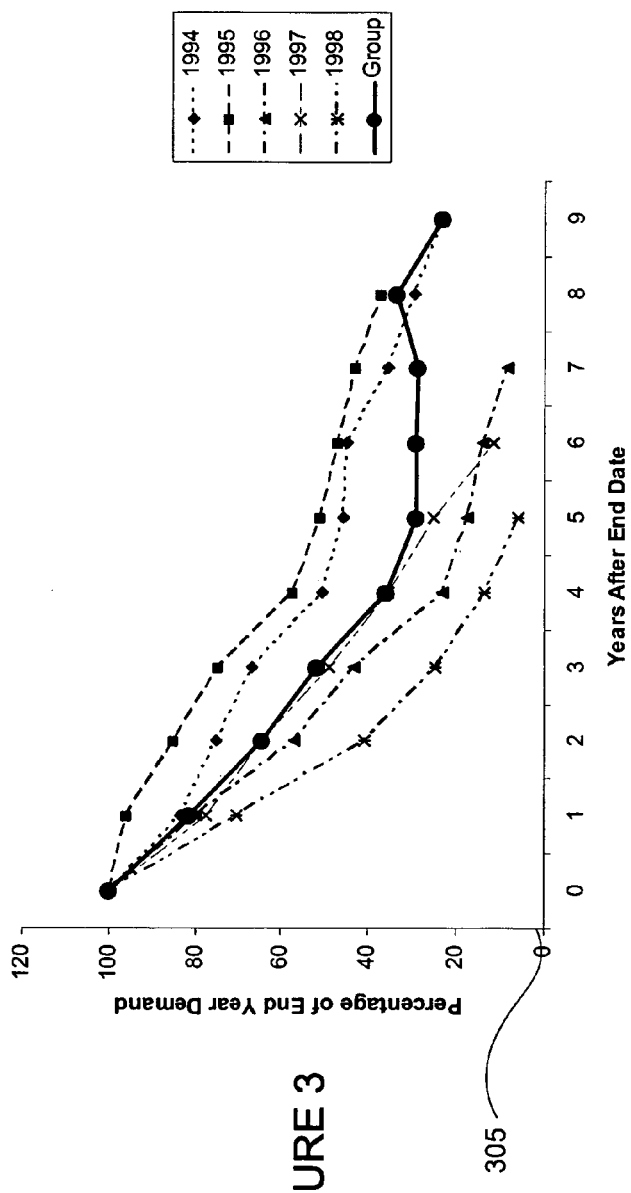
FIG. 3 illustrates an exemplary phase-out group profile and its historical data.

FIG. 3 illustrates an exemplary phase-out group profile and its historical data. Five sub-groups (five different end years), and their associated percentages for the demand of a particular year as compared to their respective end year, are shown in the table 301. For example, for products associated with the end year of 1995, the demand for the first year after the end year (in other words 1996) was 96% of the demand for the end year, the second year after the end year 85.3%, etc. From these sub-group values, total demand curve percentages 303 may be calculated, a phase-out curve plotted 305, and/or a standard deviation for the group calculated.

Figure 4:
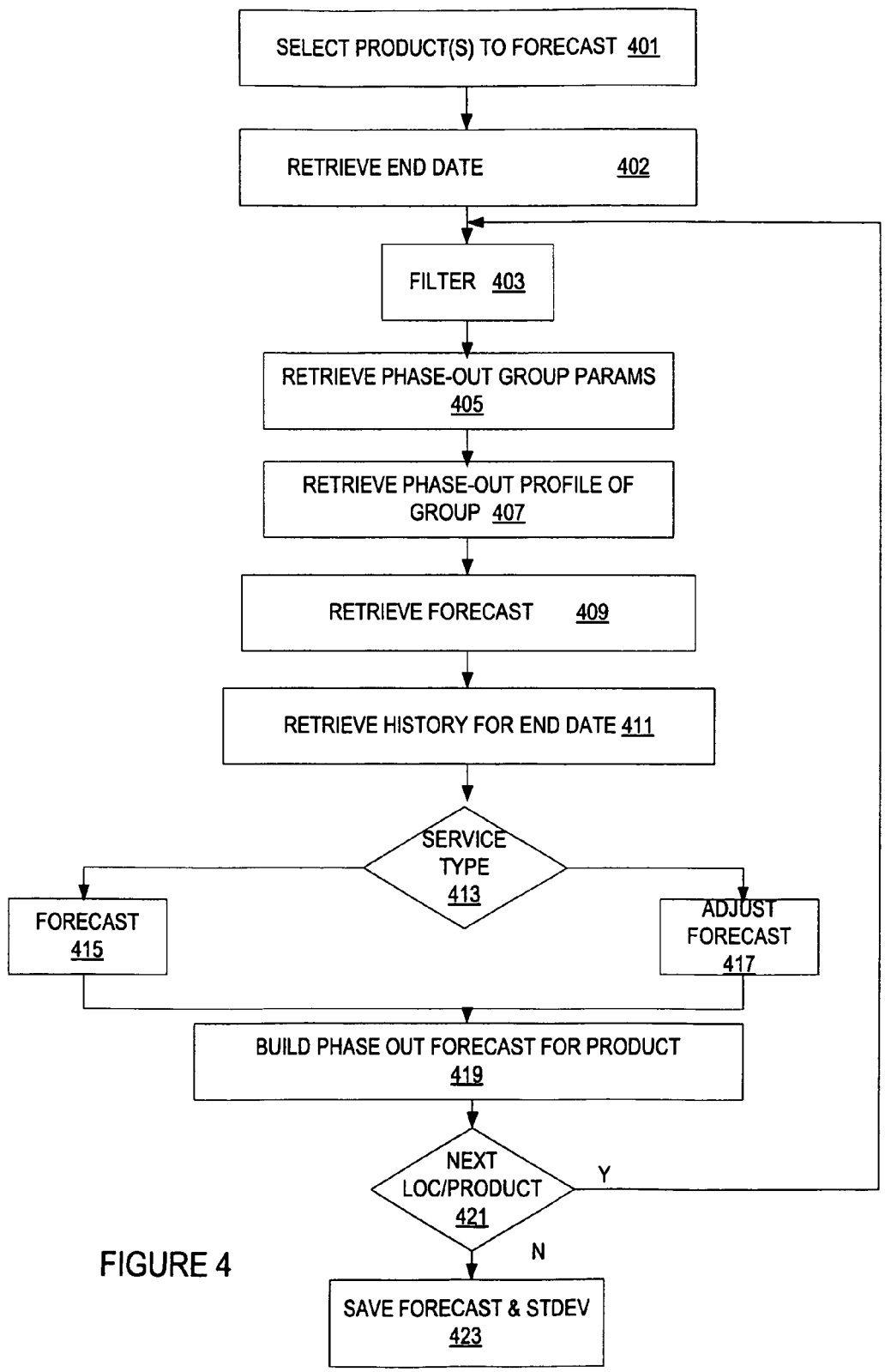
FIG. 4 shows a flow for generating a forecast for a phased-out product according to an embodiment.

FIG. 4 shows a flow for generating a forecast for a phased-out product according to an embodiment. A forecast is a set of expected demand values of a product over a selected period of time. Using the forecast, the number of products that should be shipped to or held at a location may be determined. Of course, other actions (such as how many products to make, how to manage space at a particular location, etc.) may be performed based on forecast information. The flow of FIG. 4 may be performed by a planning service manager or other similar software application that provides a user with a set of tools for managing the logistics of supply chain management.

The phased-out product or products that are to be forecasted are selected at 401. The production end date associated with the product(s) is retrieved at 402. A filter may be used to remove phased-out products that do not meet at least some designated criteria (rules) at 403. Exemplary rules include, but are not limited to, removing products that: 1) do not have a phase-out group assigned; 2) do not have a production end date; 3) have a production end date that is in the future; and/or 4) is not a product associated with a particular location. Filtering may also determine if the products or products belong to a group.

The selected product or products has associated data which may be stored in a storage device such as a hard disk, database, or similar storage system. The data associated with a product may include demand history data, a phase-out group relationship/assignment, a production end date, promotional information, a phase-out group profile, and similar historical data.

The phase-out group parameters are retrieved at 405. Special interest may be paid to the default phase-out profile value for the calculation of the forecast.

The phase-out profile associated with the product's group is retrieved at 407. This profile has the standard deviation, demand curve, forecast (if any), etc. for the group as described earlier.

If the phase-out profile has a forecast, that forecast is retrieved at 409. However, this forecast may be later adjusted and/or overwritten.

The historical data associated with the product at the end date is retrieved at 411. These are the base values on which a new forecast is based. For example, if the demand in the end year for 700 products, then the forecast would use that value as the starting point for successive years.

A determination as to which type of forecasting service is to be performed is made at 413. If no forecast exists or the number of historical periods recommended before an adjustment of a long-term forecast has not passed, then a "new" forecast will be run at 415. The forecast is performed by applying the phase-out profile (demand curve values and possibly the standard deviation values) to available historical data for the product beginning from the end date and lasting for the number of periods defined by the phase-out group profile (if so defined). If the length of the desired forecast is longer than there phase-out profile values available, then an exponential extrapolation (using one or more of the last phase-out profile values) and/or default values may be used to further forecast. The minimum phase-out threshold may also be taken into account and values not allowed to go below this threshold.

FIG. 5 illustrates a long-term forecast example. In this example, the phased-out product had a demand of 1000 products in its end year. By applying the demand curve of FIG. 3 to this number, the first year after the product's end year is predicted to have 816 products demanded, the second year after the end year 645 products, etc. The standard deviation for the group may also be taken into account. Also, forecasts may be made to any significant digit but are typically represented by whole numbers.

An adjustment to an existing forecast may be made at 417. Adjustments provide for a more accurate forecast that is based on historical demand data that was not available at the time of the previous forecast. For example, if two years have passed since the previous forecast, a more accurate forecast may be made using the additional actual demand data from those two years. An adjustment to a forecast is performed by comparing the available historical data (the actual number of products demanded) to the previous forecast. In an embodiment, the comparison begins with the year after to the end year and concludes with the year before the current year. Of course, other lengths of comparisons may be made. Additionally, in one embodiment, an adjustment cannot be made until a minimum number of historical periods beyond the end date have passed.

Figure 6:
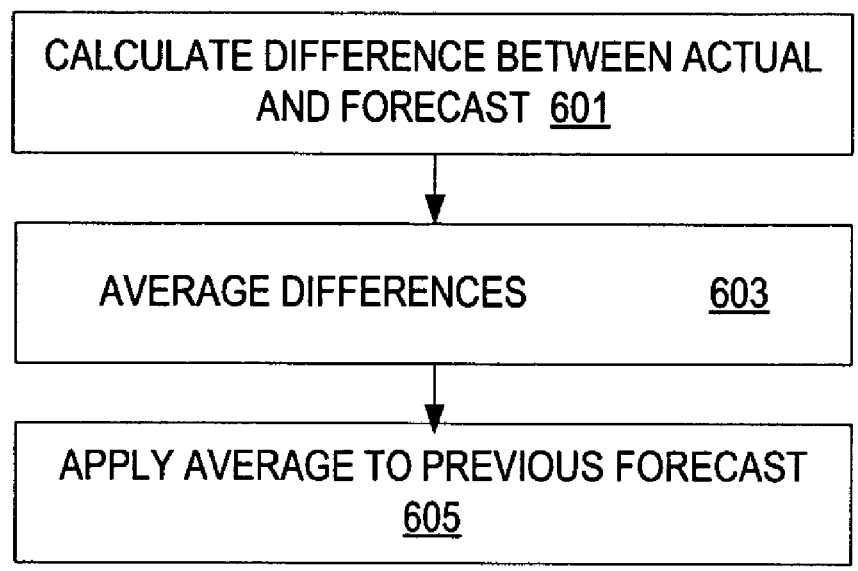
FIG. 6 illustrates an embodiment of a flow for adjusting an existing forecast.

FIG. 6 illustrates an embodiment of a flow for adjusting an existing forecast. The difference (as a signed adjustment percentage) between the historical (actual) data and the forecast for all of the historical periods is performed at 601. The signed deviation may be calculated by the following formula (1):

$$\frac{\text{Historical Data} - \text{Forecasted Data}}{\text{Forcasted Data}} * 100 \qquad (1)$$

The average of the signed percentages is calculated at 603. This average is then applied to the previous forecast at 605. This application may be calculated by the as: Forecasted Data*(100+Adjustment Percentage)/100.

FIG. 7 is long-term forecast adjustment example. This example builds off of the previous forecast shown in FIG. 5. Three years of additional data 701 have been gathered and should help provide a more accurate future forecast. Variances 703 have been calculated for these three years along with a percentage over/under from the previous year. The sum of these signed percentages is divided by the number of data points (in this case three). In this example, the adjustment percentage is (9.33+19.4+26.1)/3 or 18.3%. The old forecast is adjusted by this percentage.

The forecast is temporarily saved at 419. A determination is made if there are more products in the group to forecast at 421. If there are, then the products are filtered again at 403. If not, then all of the previous forecasts for the group are combined and saved at 423.

Figure 8:
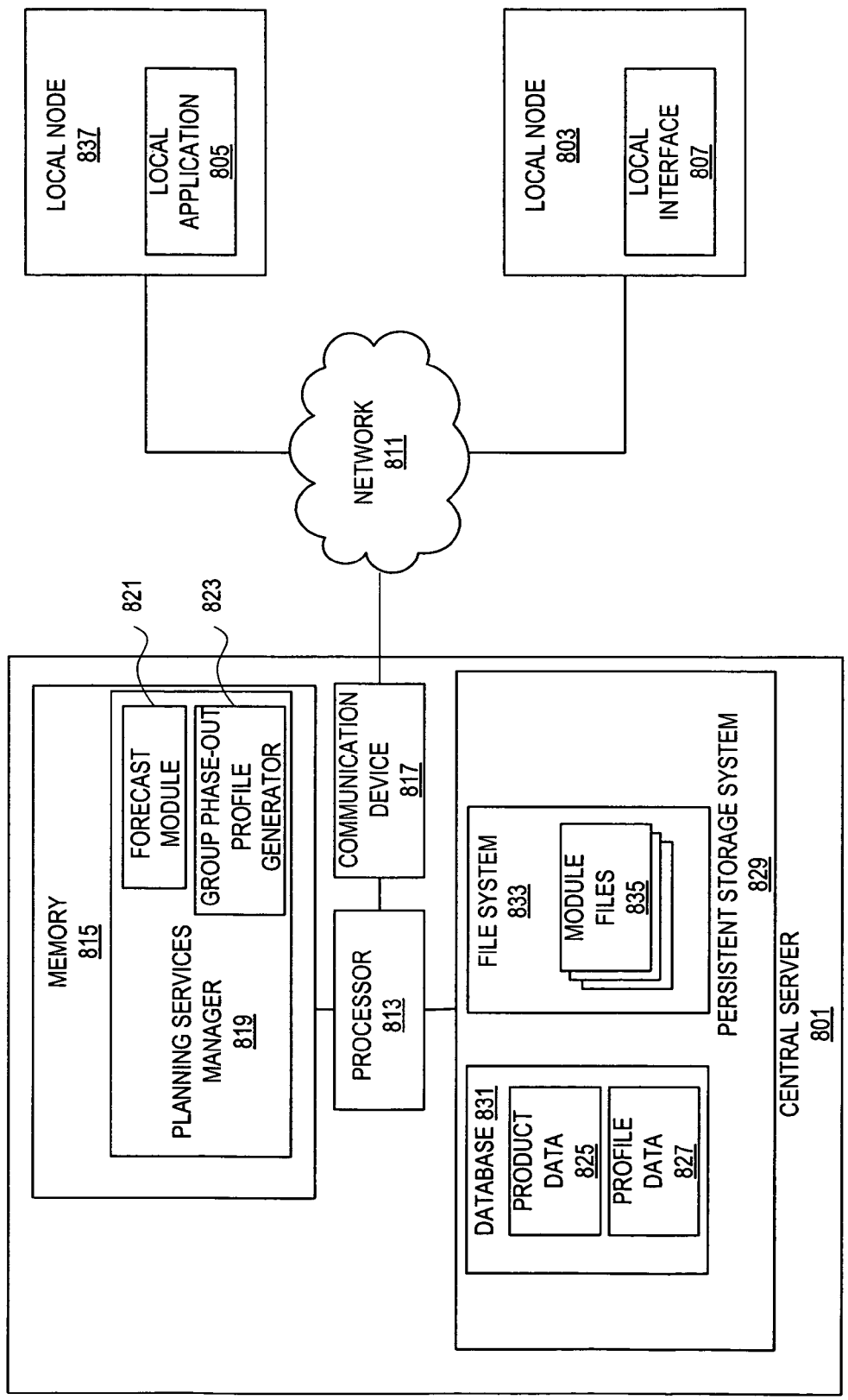
FIG. 8 is an embodiment of a system for long-term demand forecasting.

FIG. 8 is an embodiment of a system for long-term demand forecasting. Central server 801 includes one or more processors 813, communications devices 817 (such as an Ethernet card, modem, etc.), and working memory 815 (such as RAM). The planning services manager 819 of the working memory 815 includes a forecast module 821 to generate and/or adjust phased-out product forecasts (as described earlier) and a group phase-out profile generator 823 to generate a phase-out profile (as described earlier). Of course, the forecast module 821 and group phase-out profile generator 823 may be separate from the planning services manager 819. The forecast module 821 and profile generator 823 have access to the database 831 for product data 825 and profile data 827. Files 835 associated with these applications may be stored in a file system 833 in communication with a set of processors 813. Storage for the file system 833 and/or database 831 may be of any type, including, but not limited to, one or more physical storage devices such as fixed disks, optical storage mediums, and magnetic storage mediums. Database 831 may be a relational database or object oriented database.

Local nodes 837, 803 may include local applications 805 or interfaces 807 which include a portion of the functionality provided by the central server 801 such as forecast modules and/or profile generators. Local nodes 837, 803 may also be configured to communicate through a network 811 to the central server 801. Through this communication the local nodes 837, 803 may call functions of the forecast module 821 and profile generator 823, and retrieve data from the storage system.

Figure 9:
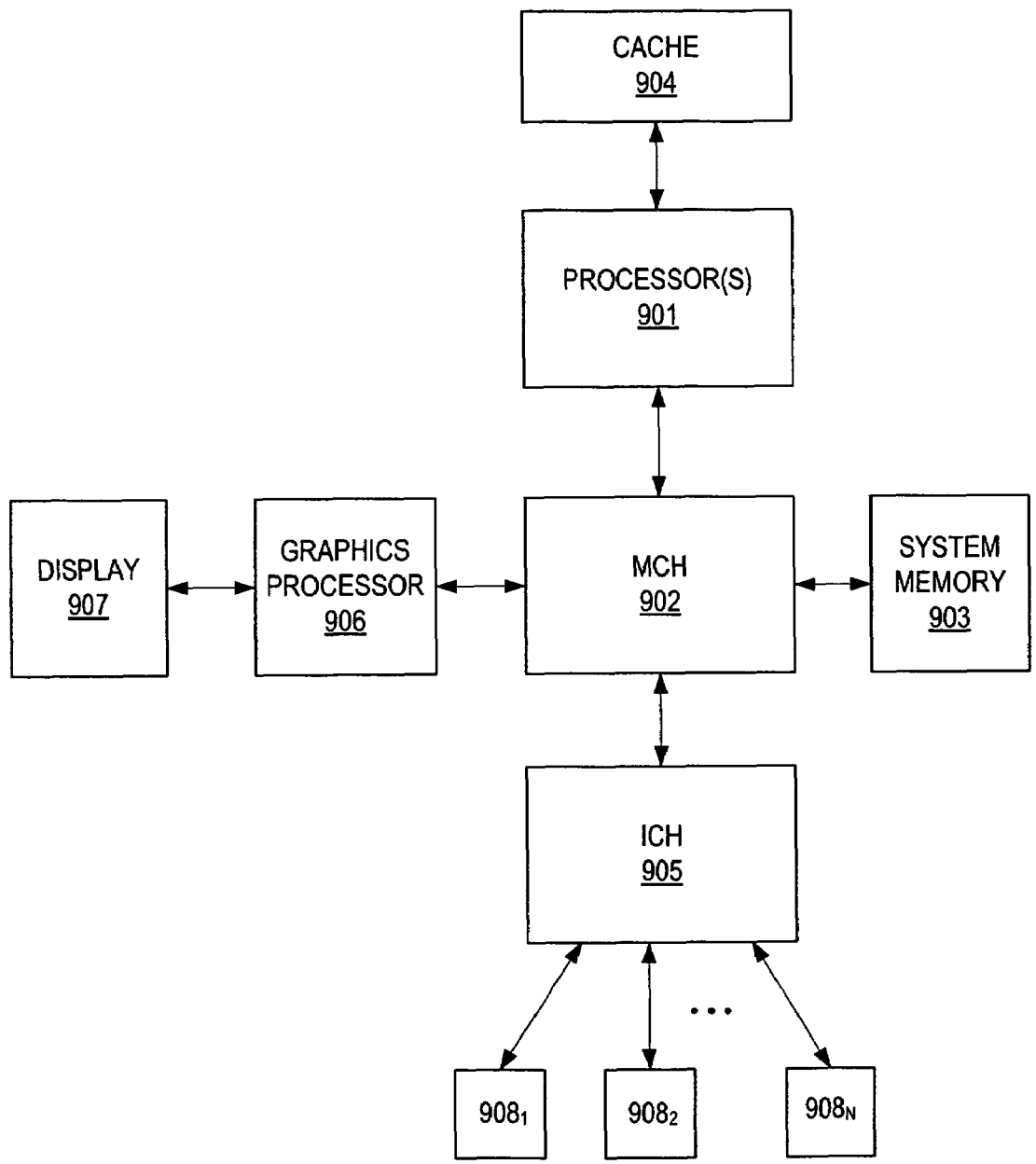
FIG. 9 shows an embodiment of a computing system (e.g., a computer).

FIG. 9 shows an embodiment of a computing system (e.g., a computer). The exemplary computing system of FIG. 9 includes: 1) one or more processors 901; 2) a memory control hub (MCH) 902; 3) a system memory 903 (of which different types exist such as DDR RAM, EDO RAM, etc,); 4) a cache 904; 5) an I/O control hub (ICH) 905; 6) a graphics processor 906; 7) a display/screen 907 (of which different types exist such as Cathode Ray Tube (CRT), Thin Film Transistor (TFT), Liquid Crystal Display (LCD), Digital Light Processing (DLP), Organic LED (OLED), etc.; and 8) one or more I/O and storage devices 908.

The one or more processors 901 execute instructions to perform whatever software routines the computing system implements. The instructions frequently involve some sort of operation performed upon data. Both data and instructions are stored in system memory 903 and cache 904. Cache 904 is typically designed to have shorter latency times than system memory 903. For example, cache 1604 might be integrated onto the same silicon chip(s) as the processor(s) and/or constructed with faster SRAM cells whilst system memory 903 might be constructed with slower DRAM cells. By tending to store more frequently used instructions and data in the cache 904 as opposed to the system memory 903, the overall performance efficiency of the computing system improves.

System memory 903 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 903 prior to their being operated upon by the one or more processor(s) 901 in the implementation of a software program. Similarly, data that a software program determines should be sent from the computing system to an outside entity through one of the computing system interfaces, or stored into an internal storage element, is often temporarily queued in system memory 903 prior to its being transmitted or stored.

The ICH 905 is responsible for ensuring that such data is properly passed between the system memory 903 and its appropriate corresponding computing system interface (and internal storage device if the computing system is so designed). The MCH 902 is responsible for managing the various contending requests for system memory 903 access amongst the processor(s) 901, interfaces and internal storage elements that may proximately arise in time with respect to one another.

One or more I/O devices 908 are also implemented in a typical computing system. I/O devices generally are responsible for transferring data to and/or from the computing system (e.g., a networking adapter); or, for large scale non-volatile storage within the computing system (e.g., hard disk drive). ICH 905 has bi-directional point-to-point links between itself and the observed I/O devices 908. A capture program, classification program, a database, a filestore, an analysis engine and/or a graphical user interface may be stored in a storage device or devices 908 or in memory 903.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, ABAP, Fortran, Pascal, Perl, etc.) supported by various software development frameworks (e.g., Microsoft Corporation's .NET, Mono, Java, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.), or a more specific form of program code that is targeted for a specific processor.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A machine readable medium having instructions stored therein which when executed cause a machine to perform a set of operations comprising:
   retrieving data about a phased-out product from a storage system;
   retrieving a group phase-out profile associated with the phased-out product the group phase-out profile generated by sorting a plurality of phased-out products into groups and aggregating a phase-out profile for each group member; and
   forecasting demand for the phased-out product based on the group phase-out profile and retrieved data;
   updating the data about the phased-out product; and
   forecasting an updated demand for the phased-out product based on the group phase-out profile and updated data.

2. The machine readable medium of claim 1, further comprising:
   determining a group for the phased-out product.

3. The machine readable medium of claim 2, further comprising:
   forecasting demand for the group.

4. The machine readable medium of claim 1, wherein retrieving data comprises:
   retrieving a standard deviation value for the phased-out product.

5. The machine readable medium of claim 3, further comprising:
   calculating a demand forecast range for a time period using the standard deviation value.

6. The machine readable medium of claim 1, further comprising:
   generating a phase-out profile associated with the phased-out product.

7. A machine readable medium having instructions stored therein which when executed cause a machine to perform a set of operations comprising:
   retrieving data about a phased-out product from a storage system;
   retrieving a group phase-out profile associated with the phased-out product the group phase-out profile generated by sorting a plurality of phased-out products into groups and aggregating a phase-out profile for each group member; and
forecasting demand for the phased-out product based on the group phase-out profile and retrieved data wherein generating the phase-out profile further includes:
   determining a product to profile;
   evaluating parameters and historical data associated with the product; and
   calculating a standard deviation for the historical data.

8. The machine readable medium of claim 7, further comprising:
   determining a group to associate the product with, wherein members of the group share similar traits.

9. The machine readable medium of claim 8, further comprising:
   generating the group phase-out profile.

10. The machine readable medium of claim 9, wherein the generating the phase-out profile for the group further comprises:
   generating a phase-out profile for each member of the group; and
   aggregating the phase-out profiles for each member of the group into a single phase-out profile.

11. A method comprising:
   generating a group phase-out profile for a phased-out product by aggregating a phase-out profile for the phased-out product with other phase-out profiles from an assigned group;
   generating a demand forecast for the product associated with the group phase-out profile; and
   wherein generating a phase-out profile for a product that is no longer produced further includes:
   determining a product to profile;
   evaluating parameters and historical data associated with the product; and
   calculating a standard deviation for the historical data.

12. The method of claim 11, further comprising:
   gathering data about the phased-out product after the generating of the demand forecast; and
   adjusting the demand forecast based on the data gathered after the generation of the forecast.

13. The method of claim 11, wherein the parameters comprise:
   an amount of time for which the long-term demand forecast should be generated;
   a number indicating a minimum number of products needed for calculating the phase-out profile;
   a threshold value indicating the minimum product percentage value for the phase-out profile; and
   a number indicating a minimum number of years of history necessary to generate a phase-out profile.

14. The method of claim 11, further comprising:
   applying at least one rule from a set of rules to determine if a phase-out profile for the phased-out product should be generated.

15. The method of claim 14, wherein the set of rules comprises:
   determining if:
   a phase-out group has been assigned to the product;
   a production end date has been assigned to the product;
   the production end date is in the future;
   the product is a successor product; and
   the product is a predecessor product.

16. The method of claim 14, further comprising:
   grouping a set of products that share at least one characteristic into a single phase-out group.

17. The method of claim 11, wherein generating a demand forecast for the product associated with the phase-out profile further comprises:
   retrieving parameters and historical data associated with the product;
   applying the values of the phase-out profile to the historical data associated with the product.

18. The method of claim 11, further comprising:
   filtering the plurality of phased-out products prior to the sorting.

19. The method of claim 18, wherein the filtering removes any one of ungrouped phased-out products, phased-out products without a production end date, phased-out products with a production end date in the future.

* * * * *